(12) United States Patent
Meijer

(10) Patent No.: US 12,460,668 B2
(45) Date of Patent: Nov. 4, 2025

(54) SET OF PANELS AND AN ASSOCIATED ASSEMBLED ARTICLE

(71) Applicant: Välinge Innovation AB, Viken (SE)

(72) Inventor: Thomas Meijer, Viken (SE)

(73) Assignee: VÄLINGE INNOVATION AB, Viken (SE)

(*) Notice: Subject to any disclaimer, the term of this patent is extended or adjusted under 35 U.S.C. 154(b) by 307 days.

(21) Appl. No.: 18/191,404

(22) Filed: Mar. 28, 2023

(65) Prior Publication Data

US 2023/0313823 A1 Oct. 5, 2023

(30) Foreign Application Priority Data

Mar. 30, 2022 (SE) .................................... 2250390-8

(51) Int. Cl.
*F16B 12/12* (2006.01)
*F16B 12/26* (2006.01)
(Continued)

(52) U.S. Cl.
CPC ............ *F16B 12/125* (2013.01); *F16B 12/26* (2013.01); *A47B 47/042* (2013.01); *F16B 2012/466* (2013.01)

(58) Field of Classification Search
CPC . A47B 47/0075; A47B 47/042; A47B 96/201; A47B 2230/02; A47B 2230/0074; A47B 2230/0077; A47B 2230/0081; A47B 2230/0096; F16B 12/125; F16B 12/24; F16B 12/26; F16B 12/46; F16B 2012/466; Y10S 403/11; Y10S 403/13
(Continued)

(56) References Cited

U.S. PATENT DOCUMENTS 10,104,960 B2 * 10/2018 Devos .................... F16B 12/125
10,544,818 B2 * 1/2020 Fridlund ............... F16B 12/125
(Continued)

FOREIGN PATENT DOCUMENTS

WO 87/07339 A1 12/1987
WO 2019/203720 A1 10/2019

OTHER PUBLICATIONS

Office Action issued Dec. 9, 2022, by the Swedish Patent and Registration Office in corresponding Swedish Patent Application No. 2250390-8. (9 pages).
(Continued)

*Primary Examiner* — Josh Skroupa
(74) *Attorney, Agent, or Firm* — Boone IP Law

(57) ABSTRACT

A set of panels including a first panel and a second panel configured to assume a locked state in which a first main plane of the first panel is arranged at an angle of between 30° and 150° relative to a second main plane of the second panel. A separate tongue arranged in an insertion groove provided in a groove of the first panel is configured to cooperate with a locking portion of the recess provided in the edge section of the second panel for locking the panels in a first direction perpendicular to the first main plane, and the edge section is configured to cooperate with the groove for locking the panels in a second direction parallel to the first main plane. The locking portion is disposed at a locking angle below 45° with respect to the second main plane and/or the first direction.

14 Claims, 6 Drawing Sheets

(51) Int. Cl.
*F16B 12/46* (2006.01)
*A47B 47/04* (2006.01)

(58) Field of Classification Search
USPC .................................. 403/DIG. 11, DIG. 13
See application file for complete search history.

(56) References Cited

U.S. PATENT DOCUMENTS

| | | | |
|---|---|---|---|
| 10,876,562 B2 * | 12/2020 | Pervan | ................... F16B 12/24 |
| 2012/0279161 A1 | 11/2012 | Håkansson et al. | |
| 2015/0196118 A1 | 7/2015 | Derelöv | |
| 2017/0089379 A1 | 3/2017 | Pervan | |
| 2017/0227035 A1 | 8/2017 | Fridlund | |
| 2022/0018373 A1 | 1/2022 | Boo | |
| 2022/0408912 A1 | 12/2022 | Lundin et al. | |

OTHER PUBLICATIONS

U.S. Appl. No. 18/440,330, Thomas Meijer, filed Feb. 13, 2024.
U.S. Appl. No. 18/441,480, Peter Derelöv, filed Feb. 14, 2024.
U.S. Appl. No. 19/048,028, Oscar Rydsjö, filed Feb. 7, 2025.
U.S. Appl. No. 19/068,325, Oscar Rydsjö, filed Mar. 3, 2025.
U.S. Appl. No. 18/766,880, Thomas Meijer, filed Jul. 9, 2024.
U.S. Appl. No. 18/271,460, Peter Derelöv, filed Feb. 9, 2023.
U.S. Appl. No. 17/398,416, Thomas Meijer, filed Aug. 10, 2021.
U.S. Appl. No. 17/514,055, Marko Sostar, filed Oct. 29, 2021.
U.S. Appl. No. 17/665,160, Oscar Rydsjö, filed Feb. 4, 2022.
U.S. Appl. No. 17/847,655, Thomas Meijer, filed Jun. 23, 2022.
U.S. Appl. No. 17/784,341, Johan Svensson, filed Jun. 10, 2022.
U.S. Appl. No. 17/870,215, Peter Derelöv, filed Jul. 21, 2022.
U.S. Appl. No. 17/959,010, Mindaugas Zacharenko, filed Oct. 3, 2022.
U.S. Appl. No. 18/058,037, Peter Derelöv, filed Nov. 22, 2022.
U.S. Appl. No. 18/239,924, Niclas HÅkansson, filed Aug. 30, 2023.
U.S. Appl. No. 18/422,368, Christian Boo, filed Jan. 25, 2024.
U.S. Appl. No. 18/422,425, Christian Boo, filed Jan. 25, 2024.
U.S. Appl. No. 19/226,620, Henrik Lindquist, filed Jun. 3, 2025.
U.S. Appl. No. 19/184,232, Thomas Meijer, filed Apr. 21, 2025.

* cited by examiner

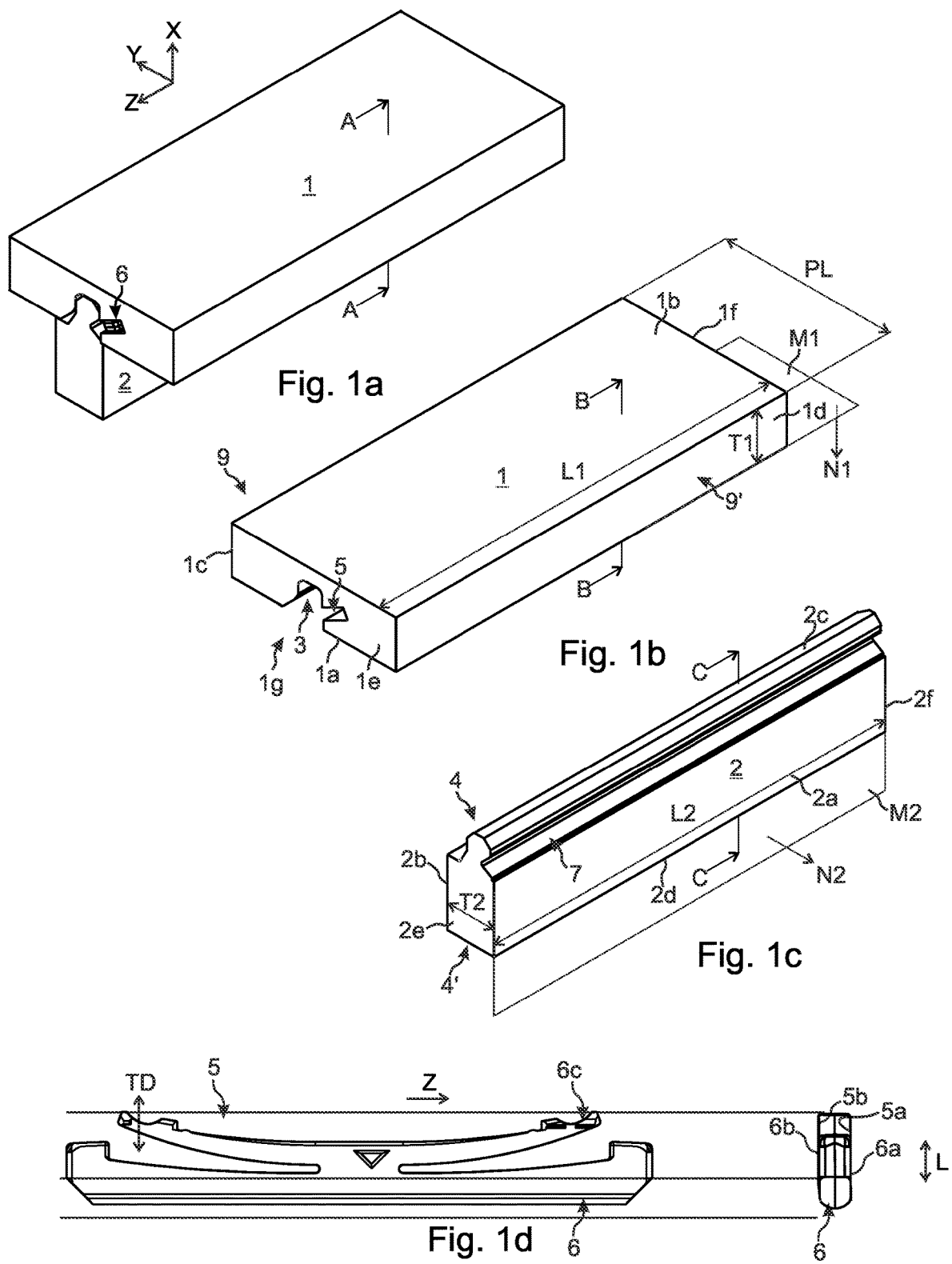

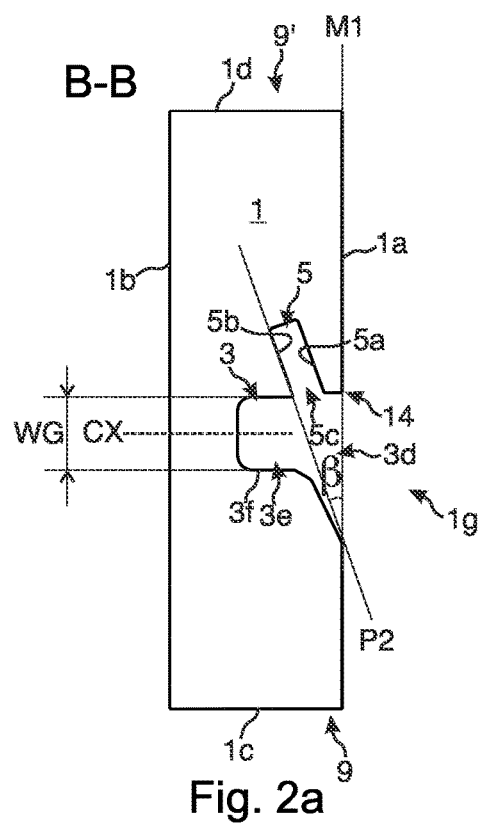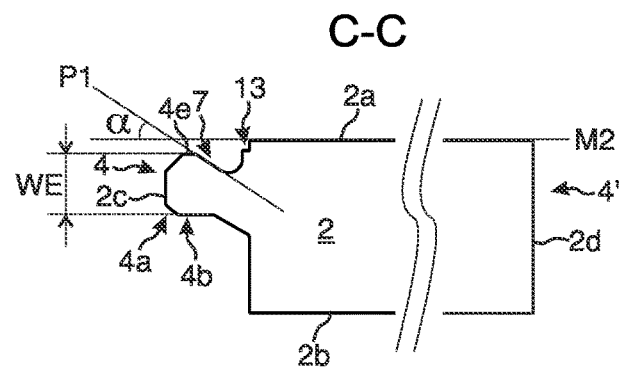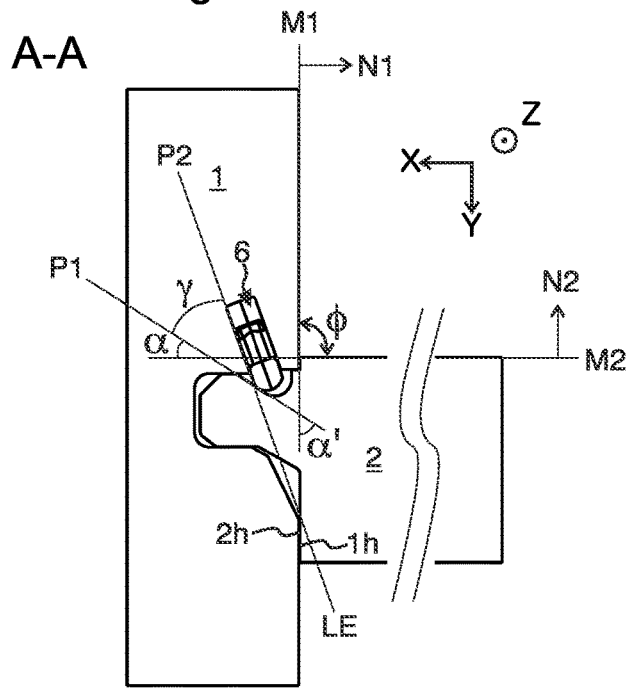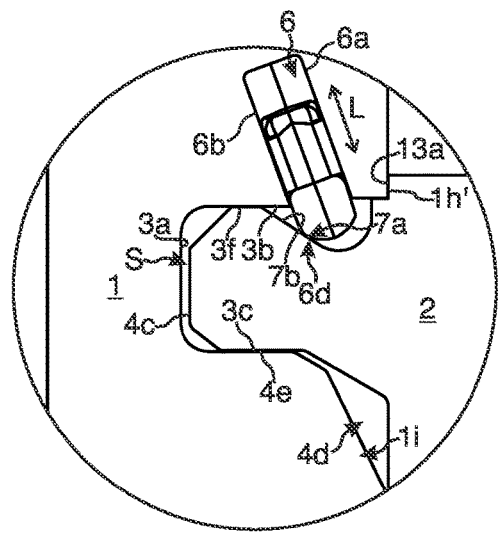
Fig. 2a
Fig. 2b
Fig. 2c
Fig. 2d

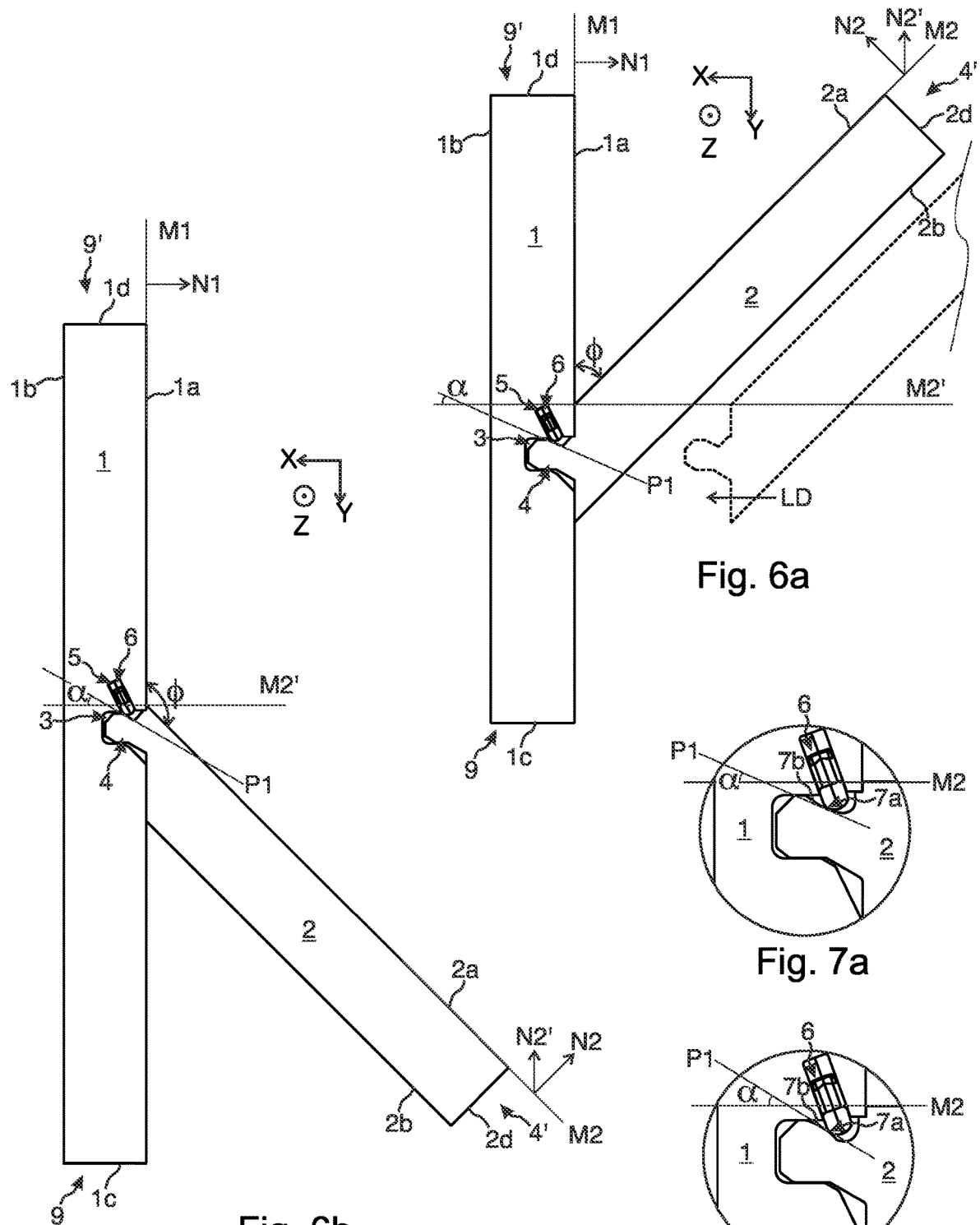

SET OF PANELS AND AN ASSOCIATED ASSEMBLED ARTICLE

CROSS REFERENCE TO RELATED APPLICATIONS

The present application claims the benefit of Swedish application No. 2250390-8, filed on Mar. 30, 2022. The entire contents of Swedish application No. 2250390-8 are hereby incorporated herein by reference in their entirety.

TECHNICAL FIELD

The disclosure generally relates to a set of panels comprising a first panel and a second panel that are configured to be locked to each other at angle of between 30° and 150°, such as essentially perpendicularly, to each other by means of a mechanical locking device. The panels may be assembled and locked to each other to provide an assembled article.

BACKGROUND

WO 2019/203720 A1 discloses a set comprising a mechanical locking device for locking of a first and a second panel to each other. The first panel comprises a first edge surface and a first panel surface and the second panel comprises a second edge surface and a second panel surface. The mechanical locking device comprises an insertion groove at the second edge surface, a flexible tongue positioned in the insertion groove and an edge tongue comprising a tongue groove. A first locking surface of the flexible tongue is configured to cooperate with the tongue groove for locking of the first and second panels in a first direction when the flexible tongue is positioned in the insertion groove in a first orientation, and a second locking surface of the flexible tongue is configured to cooperate with the tongue groove for a locking of the first and second panels in a first direction when the flexible tongue is positioned in the insertion groove in a second orientation.

There have been attempts to develop sufficiently accurate techniques to form parts of a mechanical locking device that are distanced from a corner area of a panel, such as in a middle section thereof. However, the associated machinery available today is typically not adapted per se to operate at a relatively large distance from the corner area, and suboptimal solutions are therefore often relied upon. Moreover, it may sometimes be challenging to form at least parts of the mechanical locking device in panels that are composed of lighter materials or have lower qualities. By way of example, the dimensional accuracy of such panels may not always be sufficiently satisfactory, which may complicate the forming of a reliable mechanical locking device. One known solution is to measure some panel dimensions, such as a panel thickness, whereby an operating distance of a machining tool relative to the panel may be adjusted correspondingly. However, the solutions presented so far often involve cumbersome, costly and time-consuming operations.

SUMMARY

It is therefore an object of at least embodiments of the present disclosure to provide a set of panels comprising a mechanical locking device that is adapted for panels having a relatively large thickness variation and/or that is adapted to be provided in an interior portion of a face of a panel.

Another object of at least embodiments of the present disclosure is to provide a set of panels according to any of the objects stated above while providing a sufficiently high locking strength and/or satisfactory locking function.

Yet another object of at least embodiments of the present disclosure is to provide a set of panels according to any of the objects stated above while simplifying the forming of the mechanical locking device.

It is also an object to provide a corresponding assembled article.

These and other objects and advantages that will be apparent from the description have been achieved by the various aspects, embodiments and examples described below.

According to a first aspect of the disclosure, there is provided a set of panels comprising a first panel and a second panel configured to assume a locked state in which a first main plane of the first panel is arranged at an angle of between 30° and 150°, such as between 45° and 135°, relative to a second main plane of the second panel. The set comprises a groove provided in the first panel, an edge section of the second panel, an insertion groove provided in the groove of the first panel, wherein a separate, preferably flexible, tongue is arranged in the insertion groove, and a recess provided in the edge section of the second panel. The separate tongue is configured to cooperate with a locking portion of the recess for locking the first and second panels to each other in a first direction perpendicular to the first main plane, and the edge section of the second panel is configured to cooperate with the groove of the first panel for locking the first and second panels to each other in a second direction parallel to the first main plane and extending towards a side edge surface of the first panel. The locking portion is disposed at a locking angle below 45° with respect to the second main plane and/or with respect to the first direction.

In accordance with the first aspect, an extension of the locking portion along the second main plane and/or the first direction may become larger, for example as compared to a locking portion disposed at a higher locking angle. At least a segment of the locking portion may become more aligned with the second main plane. Consequently, during locking and/or in the locked state, the separate tongue may be allowed to be positioned along a larger portion of the recess, while providing a satisfactory locking function. Also, dimensional tolerances of the mechanical locking device (often shortened herein to "locking device"), such as of the groove and/or the insertion groove, along the second main plane and/or the first direction may become greater. Hence, a locking device that is adapted for panels having a relatively large thickness variation may be obtained. A thickness variation exceeding±0.2 mm, such as at least ±0.3 mm or at least ±0.6 mm or even at least ±0.8 mm, may be tolerated. This is a substantial improvement and should be contrasted with known locking devices, which typically tolerates±0.2 mm or less.

Additionally, by tolerating a larger thickness variation, it may be simpler to form the locking device. For example, and as will be detailed elsewhere herein, the groove and/or insertion groove may be formed in the first panel by means of a first and/or a second groove tool that, at least during a part of the forming process, are/is arranged at a fixed distance from a support member on which the first panel may be provided.

In addition, even though the locking angle is smaller than 45°, a sufficiently high locking strength of the locking device may be provided for many applications, such as when the groove is provided in an interior portion of a face of a panel. However, the locking device may for some applications also be suitable for a corner section of panels for which the groove may be provided in an edge portion of the first panel.

Throughout the disclosure when referring to "panels", the first and second panels may be included as examples of such "panels". Generally herein, the first panel may comprise a pair of edge portions and an interior portion disposed therebetween and separated from the edge portions.

The panels may be substantially rectangular or square. Each panel may comprise a pair of faces and a pair of side edge surfaces extending between the faces. Moreover, each panel may comprise a pair of side portions extending between the faces and between the side edge surfaces. The side edge surfaces may be provided in a respective edge portion or edge section of each panel.

The first and second main planes may be arranged at angle of 30°-150°, such as around 90°, as seen from a (cross-sectional) side view, preferably along a third direction which is perpendicular to the first and second directions.

The panels, such as the first and second panels, may be components adapted to be assembled to an assembled article, such as a box or a furniture assembly.

Generally herein, cooperating elements (such as between the separate tongue and the recess, between the edge section and the groove, between a fitting groove and a corner portion, or between an overlapping portion and a face portion) may cooperate by direct or indirect engagement. In any embodiment described herein, there may be a sealing agent, such as a wax, silicone, a rubber strip or an adhesive, provided between the cooperating elements, thereby providing examples of an indirect engagement.

The groove may be provided in an interior portion of a first face of the first panel. Thereby, both opposing groove walls of the groove may become substantially rigid, e.g., in contrast to when the groove is provided in an edge portion of the panel, where an outer groove wall may be flexible to a degree, cf., WO 2019/203720 A1.

Typically, the requirements on the locking strength of a mechanical locking device provided in an interior portion of a panel may be lower than when it is provided in a corner section. For example, by assembling additional panels to the first and/or the second panel(s), the locking strength and/or locking function of the locking device in the interior portion may be further increased or improved.

The insertion groove may be provided at an angle of 18°-45°, such as 20°-30°, with respect to the first main plane.

The locking portion may be planar.

In some embodiments, the locking angle may not exceed 40°. The locking angle may be 20°-40° or 30°-40°, such as 20°-30°. When the locking angle is lower than 20°, there is a risk, at least in some embodiments, that the locking strength becomes too low.

A relative angle between the locking portion and the insertion groove may be 15°-50° in the locked state, such as 20°-45° or 20°-30°.

The edge section may be distanced from, preferably a bottom portion of, the groove in the locked state by a space. Thereby, the manufacturing process may become simpler, e.g., since it may become less dependent on arranging an exact groove depth, for example with respect to the first face of the first panel. Moreover, the space may house deformations of the panels that may be induced by temperature and/or moisture variations. In view of the above, an improved, such as a more failsafe, assembly and/or locking function of the panels may be provided.

An outer portion of the separate tongue may be curved or may comprise a bevel. Thereby, an even less accurate positioning of the separate tongue along the recess may be needed and the operation of the locking device during assembly may become more controlled.

The first main plane may be arranged essentially perpendicularly to the second main plane. Thereby, the angle between the first and second main planes may be around 90°.

A thickness of the first panel defined by a first and a second face of the first panel may vary by more than ±0.2 mm, preferably with respect to a nominal thickness value. The locking strength and/or locking function of the mechanical locking device in accordance with the first aspect may be satisfactory even for such thickness variations. The thickness may vary, such as by more than ±0.2 mm, with respect to a nominal thickness value. The thickness of the panels in this disclosure, such as of the first panel, and optionally the second panel, may be determined by the standard described in EN 324-1:1993 or SS-EN 14322:2017.

In some embodiments, the thickness may vary by at least ±0.3 mm or at least ±0.6 mm, such as at least ±0.8 mm. For example, the thickness variation may be in a range of ±0.2 to ±3 mm, such as ±0.3 to ±2 mm.

Throughout the disclosure, the term "exceeding±0.2 mm" may be construed as either exceeding 0.2 mm and/or being smaller than −0.2 mm, and similarly for the other values herein, such as "exceeding 0.3, 0.6 or 0.8".

The first and/or second panel(s) may comprise a core layer and, optionally, a décor structure, such as a décor layer attached to the core layer. When a panel is provided with a décor structure, it may be difficult, or sometimes even impossible, to calibrate the thickness of the panels, e.g., by means of shaping or finishing, before forming of the locking device. Hence, at least in some embodiments, such as when the core layer varies in thickness, the thickness of the panel may vary. A panel or core layer of this type may be formed by casting, optionally including an application of heat and pressure, e.g., using an autoclave, or it may be formed by extrusion, optionally including a crude thickness calibration utilizing rollers. Non-limiting examples include a panel or a core layer comprising a board of acrylic glass (PMMA) and an extruded panel or extruded core layer, preferably comprising a thermoplastic material, such as PVC.

The first and/or second panel(s) may be layered comprising at least two core layers, such as three core layers. For example, the core layers may be attached to each other by an adhesive, lamination, such as by, optionally heated, rollers, or coextrusion. The thickness variations of the individual core layers may add up in the layered configuration. Typically, it may be expensive and/or difficult to calibrate the thickness of a panel of this type. Non-limiting examples include a laminated panel, such as a compact laminate panel, a mineral composite panel, a plywood-based panel, or a coextruded panel.

Thus, to reiterate the assertion above, the locking device in accordance with the first aspect is adapted to be provided in panels having a relatively large thickness variation, for example according to any of the embodiments described above.

Generally herein, an aggregated thickness of the core layer(s) and, optionally, the décor structure, may correspond to a thickness of the panel.

The panels may be light-weight panels. In some embodiments, the first and/or the second panel(s) may comprise a sandwich core, such as a honeycomb core. The sandwich core may comprise at least two layers or at least two ribbons.

The sandwich core may comprise a paper material or a card material, such as corrugated cardboard.

The first and/or second panel(s), such as a core layer thereof, may comprise a sandwich core, a plywood board, a particle board, a board of solid wood, a high-density fibre, HDF, board or a medium-density fibre, MDF, board. The dimensions, such as a thickness, of these core layers may be prone to vary, e.g., because of their manufacturing process, by means of their material composition per se, or as a result of their material composition being susceptible to deform under temperature and/or moisture variations. In some embodiments, any or all of the at least two, such as three, core layers of the panel(s) mentioned above may comprise, or may be, any of the above. For example, the first and/or second panel(s) may comprise a board-on-frame, BOF, member, preferably comprising a sandwich core sandwiched between two outer core layers. Optionally, a décor structure may be arranged on the outer core layers.

In accordance with a second aspect of the disclosure, there is provided an assembled article, preferably comprising the set of panels according to any of the embodiments of the first aspect. The assembled article may be a box, such as a casket or a coffin, or may provide a furniture assembly, such as a kitchen fixture, a bookshelf, a cupboard, a wardrobe or a drawer.

Embodiments and examples of the second aspect are largely analogous to embodiments and examples of the first aspect, whereby reference is made thereto.

Generally, all terms used herein, such as in the claims, are to be interpreted according to their ordinary meaning in the technical field, unless explicitly defined otherwise. All references to "a/an/the [element, device, component, means, step, etc.]" are to be interpreted openly as referring to at least one instance of said element, device, component, means, step, etc., unless explicitly stated otherwise. Reference to one or a plurality of "at least one element", etc., or to "one or two of two elements" may shortly be referred to as "the element(s)".

BRIEF DESCRIPTION OF THE DRAWINGS

The disclosure will in the following be described in connection to exemplary embodiments and in greater detail with reference to the appended exemplary drawings, wherein:

FIGS. 1a-1c illustrate in perspective views an embodiment of a set of panels in a locked state (FIG. 1a) and in an unlocked state (FIGS. 1b-1c).

FIG. 1d illustrates an embodiment of a separate tongue in a top view (left) and in a cross-sectional side view (right) that may be used for locking the panels in, e.g., FIGS. 1a-1c.

FIGS. 2a-2d illustrate cross-sectional side views of the set of panels in FIGS. 1a-1c along the lines A-A (FIG. 2c), B-B (FIG. 2a) and C-C (FIG. 2b) and an enlarged cross-sectional side view (FIG. 2d) of the panels in FIG. 2c.

FIGS. 6a-6b illustrate cross-sectional side views of embodiments of a set of panels in a locked state (FIGS. 6a-6b) and during locking (FIG. 6a).

FIGS. 7a-7b illustrate enlarged cross-sectional side views of a set of panels in a locked state.

DETAILED DESCRIPTION

Next, various embodiments of a set of panels comprising a first 1 and a second 2 panel will be described with reference to the embodiments in, e.g., FIGS. 1a-1d, 2a-2d, 3a-3d, 4a-4e, 5a-5f, 6a-6b and 7a-7b. The panels are configured to assume a locked state in which a first main plane M1 of the first panel 1 is arranged at an angle φ of between 30° and 150°, such as between 45° and 135°, relative to a second main plane M2 of the second panel 2. In some embodiments, and as shown in FIGS. 1a-1c, 2a-2d, 3a-3d, 4a-4b and 7a-7b, the first main plane M1 is arranged essentially perpendicularly, i.e., 90°, to the second main plane M2. In some embodiments, and as shown in FIGS. 6a and 6b, the first main plane M1 is arranged at an angle φ of between 45° and 135° relative to the second main plane M2, respectively. In any of these embodiments, a normal N1 of the first main plane M1 may be arranged at an angle φ of between 30° and 150°, such as between 45° and 135°, relative to a normal N2 second main plane M2, for example at an angle φ=90°, cf., FIGS. 1b-1c, 2c and 6a-6b.

Figure 4A:
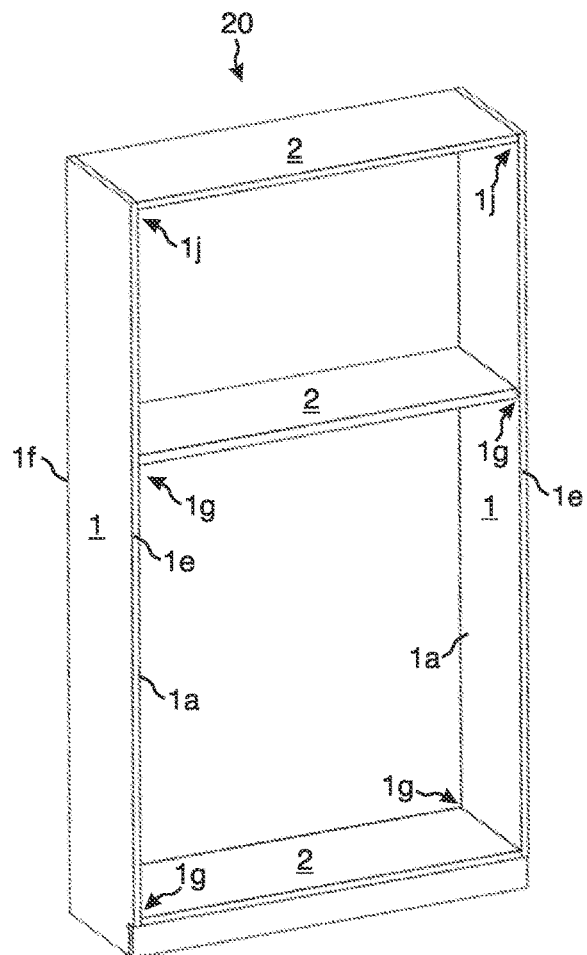
FIGS. 4a-4b illustrate in a perspective view (FIG. 4a) and in a front view (FIG. 4b) embodiments of an assembled article, such as a furniture assembly.
Figure 4B:
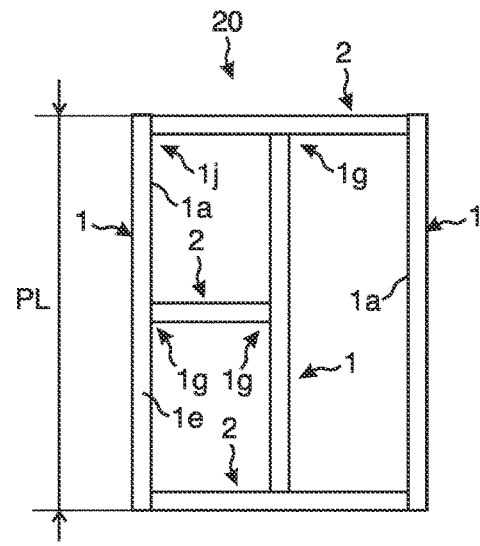

Generally herein, and as shown in FIGS. 4a-4b, the panels 1, 2 may be configured to be assembled to an assembled article 20, which may be a box, such as a casket or a coffin, or a furniture assembly, such as a kitchen fixture, a bookshelf, a cupboard, a wardrobe or a drawer. For example, the first 1 and/or second 2 panel(s) may be outer panel(s) or inner panel(s) arranged between outer panels.

As shown in, e.g., FIGS. 1a-1c and 2a-2c, each panel 1, 2 may comprise a pair of first 1a, 2a and second 1b, 2b faces, a pair of side edge surfaces 1c, 1d, 2c, 2d extending between the faces 1a, 1b, 2a, 2b, and a pair of side portions 1e, 1f, 2e, 2f extending between the faces and between the side edge surfaces 1c, 1d, 2c, 2d. The first faces 1a, 2a may be provided adjacent to each other in the locked state. The side edge surfaces 1c, 1d, 2c, 2d may be provided in a respective edge portion 9, 9' or edge section 4, 4' of the first 1 and second 2 panel. In the locked state, an edge section 4 of the second panel 2, such as a side edge surface 2c thereof, may face the first face 1a of the first panel 1.

Figure 3A:
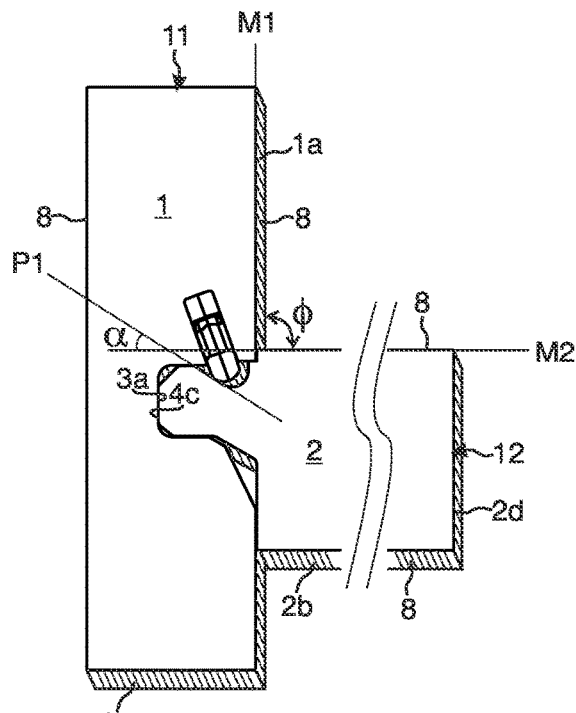
FIGS. 3a-3d illustrate in a perspective view (FIG. 3a) and cross-sectional side views (FIGS. 3b-3d) embodiments of a set of panels.
Figure 3B:
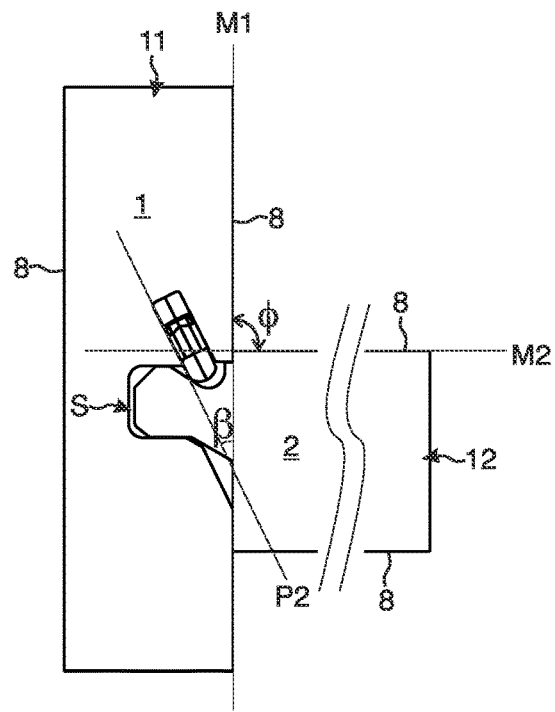

As shown in, e.g., FIGS. 3a-3b, each panel 1, 2 may comprise a core layer 11, 12. The first 1a and/or second 1b face(s) of the first and/or second panel(s) may comprise a décor structure 8, such as a décor layer. Optionally, the side edge surfaces 1c, 1d, 2c, 2d and/or the side portions 1e, 1f, 2e, 2f of the panel(s), for example BOF member(s), may be provided with border strips or frames.

Figure 3C:
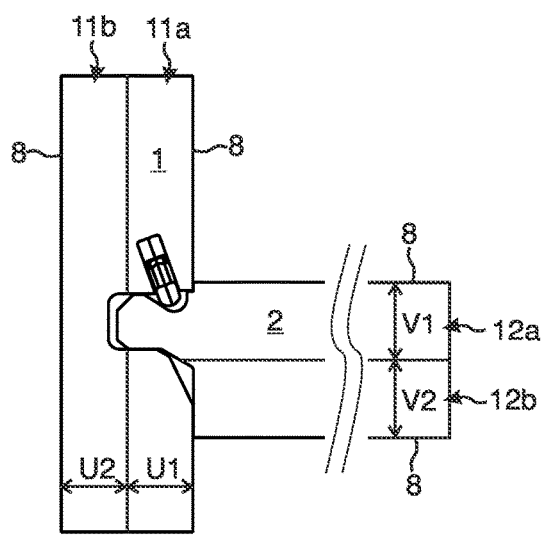
Figure 3D:
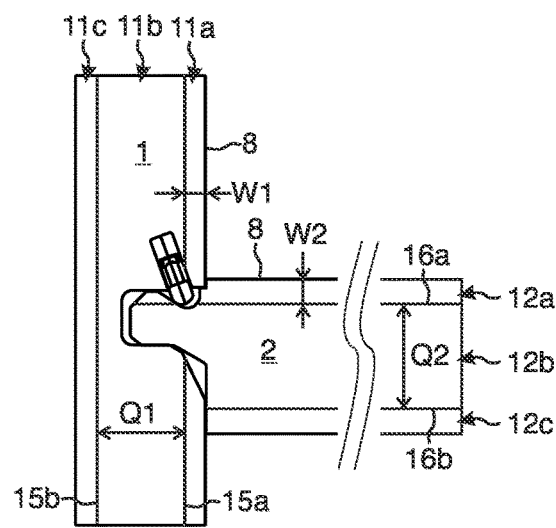

In some embodiments, as shown in FIGS. 3c-3d, the first 1 and and/or second 2 panel(s) may be layered comprising at least two core layers 11a, 11b, 12a, 12b. For example, as illustrated in FIG. 3c, a panel 1, 2 may comprise two core layers 11a, 11b, 12a, 12b, preferably having substantially the same thicknesses U1, U2, V1, V2 and/or comprising substantially the same material composition. Thereby, the balancing of the panels may be improved. Moreover, as illustrated in FIG. 3d, a panel 1, 2 may comprise three core layers, including outer core layers 11a, 11c, 12a, 12c attached to opposing faces 15a, 15b, 16a, 16b of a middle core layer 11b, 12b. Preferably, the thicknesses W1, W2 of the outer core layers 11a, 11c, 12a, 12c are smaller than the thickness Q1, Q2 of the middle core layer 11b, 12b. Layered panels, such as those described above, are conceivable in any of the embodiments herein, such as those shown in FIGS. 1a-1d, 2a-2d, 3a-3b, 4a-4e, 5a-5f, 6a-6b and 7a-7b.

The décor structure 8 may be provided on at least one of the core layers, such as on the outer core layer(s).

In non-restrictive examples, the middle core layer 11b, 12b may comprise a plywood board, a particle board, or a board of solid wood, and the outer core layers 11a, 11c, 12a, 12c may, preferably each, comprise an MDF board, an HDF board, a board of solid wood, or a veneer layer.

Any of the panels herein, such as the first 1 and/or the second 2 panel(s), may comprise a sandwich core 11, 12, 11b, 12b, such as a honeycomb core, and optionally outer core layers 11a, 11c, 12a, 12c. For example, each outer core layer may comprise a paper material or a card material, which may be attached to the middle core layer 11b, 12b, e.g., by means of an adhesive. Preferably, the panel(s) 1, 2 also comprise(s) a décor structure 8, such as a décor layer. By way of example, the first panel 1, and optionally the second panel 2, may comprise a BOF member.

A thickness of any or each core layer 11, 11a, 11b, 11c, 12, 12a, 12b, 12c described in the present disclosure may be at least 1 mm, preferably at least 2 mm or at least 4 mm. For example, a thickness may be in the range of 1-50 mm, such as 1-30 mm or 2-22 mm, for any core layer 11, 11a, 11b, 11c, 12, 12a, 12b, 12c.

A thickness T1, T2 of each panel may be essentially constant, except possibly at an interior portion 1g of the panel 1 where a groove 3 is provided (see below) and at one or both edge sections 4, 4' of the panel 2, cf., FIGS. 1b-1c, 2a-2b and 4a-4b. The thickness T1, T2 may be defined by the first 1a, 2a and the second 1b, 2b face of the panel 1, 2. Thereby, the first 1a, 2a and the second 1b, 2b face may be provided at an essentially constant distance from each other along a first direction X (defined below). For example, each panel may be substantially formed as a parallelepiped, such as a rectangular parallelepiped. In non-limiting examples, T1, T2 is larger than 10 mm, such as 16-50 mm or such as 16-18 mm, e.g., fora panel 1, 2 comprising a core layer 11 and a décor layer 8 or fora layered panel 1, 2, such as including a BOF member. In some embodiments, the first panel 1 (or second panel 2) may be thicker than the second panel 2 (or first panel 1). For example, the first panel (or second panel) may be 0.5 to 50 mm thicker, such as 5 to 10 mm thicker, than the second panel (or first panel).

The set comprises a mechanical locking device for locking the first 1 and second 2 panels to each other. The set comprises a groove 3 provided in the first panel 1, preferably in the first face 1a thereof and preferably in the interior portion 1g, such as a middle portion, of the first face 1a. The set further comprises an insertion groove 5 provided in the groove 3 in which a separate, preferably flexible, tongue 6 is arranged. Moreover, the set comprises the edge section 4 of the second panel and a recess 7 provided in the edge section 4.

The locking device may be arranged in the core layer 11, 12 or in at least some of the core layers 11a, 11b, 11c, 12a, 12b, 12c.

The interior portion 1g may be separated from the edge portions 9, 9', such as the side edge surfaces 1c, 1d, by at least 5%, such as at least 10%, of a panel length PL between the side edge surfaces 1c, 1d and/or by at least 30 mm, such as at least 60 mm, cf., FIGS. 1b and 4b.

The first main plane M1 may be parallel to the first 1a and/or second 1b face(s) and the second main plane M2 may be parallel to the first 2a and/or second 2b face(s). Preferably, the first M1 and second M2 main planes extend along the first face 1a and the second face 2a, respectively.

The first panel 1 may extend in a first direction X perpendicular to the first main plane M1 and in a second direction Y that is parallel to the first main plane M1 and extends towards a side edge surface 1c, which may be provided in the edge portion 9 of the first panel 1. In the locked state, the second direction Y may be parallel to a projection N2' of the normal N2 along the first main plane M1, cf., FIGS. 6a-6b. It is noted that N2 and N2' may coincide when φ=90°. The first panel 1 may also extend in a third direction Z, preferably extending along the first main plane M1, which is perpendicular to the first X and second Y directions.

Hence, the first X, second Y and third Z directions may be parallel to a vector extending, preferably perpendicularly, between the faces 1a, 1b, between the side edge surfaces 1c, 1d, and between the side portions 1e, 1f, respectively.

In the locked state, the projection N2' may be normal to a rotated second main plane M2', see FIGS. 6a-6b. The rotated second main plane M2' may be obtained by rotating the second main plane M2 in a clockwise direction around an axis being parallel with the third direction Z by an angle of 90°−φ. After the rotation, the main planes M1, M2' may be arranged perpendicularly to each other and the first direction X may extend along M2'. It is remarked that an obtuse angle φ implies a rotation by a negative angle, i.e., a rotation by a positive angle φ−90° in a counterclockwise direction.

The second panel 2 may extend in the third direction Z, in a direction parallel to N2, and in a direction that is parallel to the second main plane M2 and extending towards a side edge surface 2d, which may be provided in the edge section 4'. When (1)=90°, the second panel 2 may extend along the directions X, Y in the locked state.

Even though they may be defined with respect to the first panel 1, reference may typically also be made to the first X and second Y (and third Z) directions when describing the second panel 2. For example, said directions may be used when referring to the second panel when the panels assume the locked state.

Figure 5A:
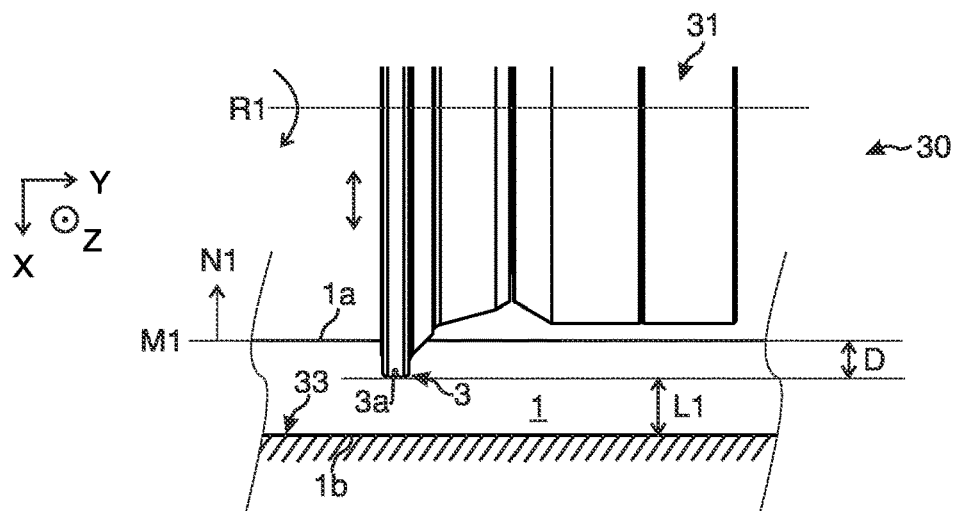
FIGS. 5a-5b illustrate embodiments of the arrangement in FIGS. 4c-4d in cross-sectional side views.
Figure 5B:
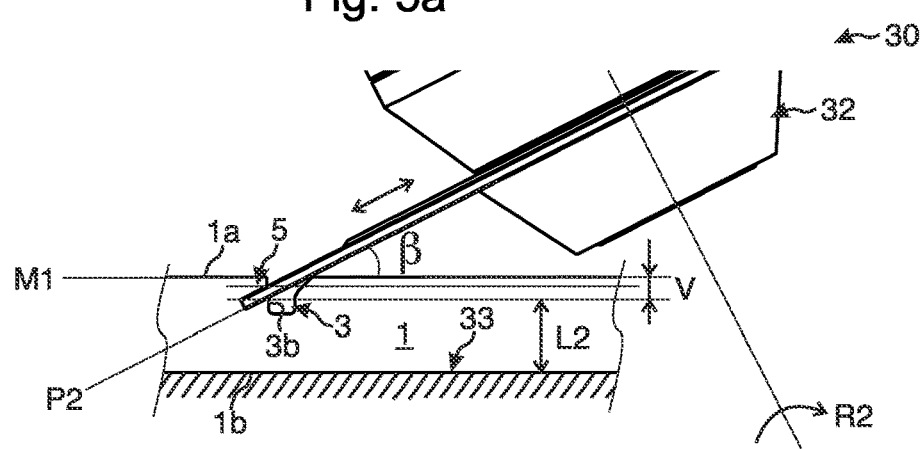
Figure 5C:
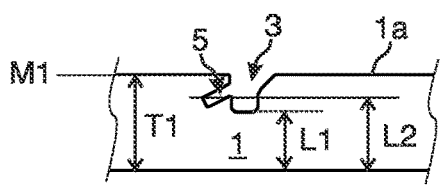
FIGS. 5c-5e illustrate in cross-sectional side views embodiments of a panel obtainable by means of the arrangement in FIGS. 4c-4d and 5a-5b.
Figure 5D:
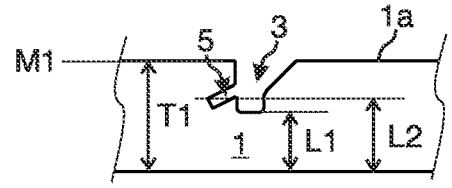
Figure 5E:
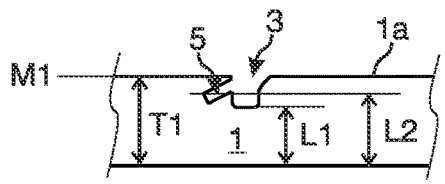
Figure 5F:
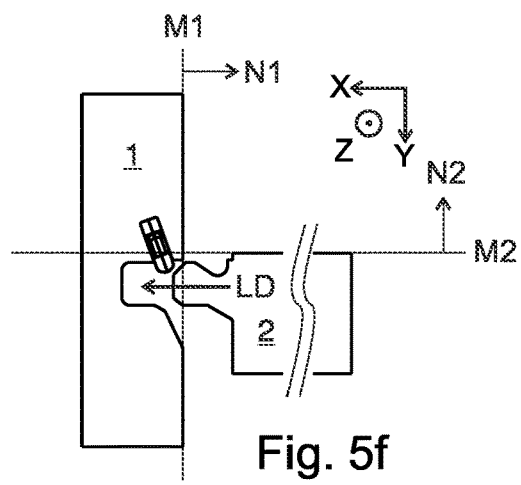
FIG. 5f schematically illustrates in a cross-sectional side view an assembly of the first and second panels.

As illustrated in FIG. 5f, and in FIG. 6a by a broken line, the panels 1, 2 herein may be configured to be locked to each other by a relative essentially linear displacement LD of the panels, preferably along the first direction X, when the first main plane M1 is arranged at the angle φ of 30°-150°, e.g., essentially at 90°, relative to the second main plane M2.

The separate tongue 6 is configured to cooperate with a locking portion 7a of the recess 7 for locking the first 1 and second 2 panels to each other in the first direction X. Moreover, the edge section 4 is configured to cooperate with the groove 3 for locking the first 1 and second 2 panels to each other in the second direction Y.

The separate tongue 6 may comprise a polymeric material and, preferably, a reinforcement structure, such as glass fibres. Moreover, as shown schematically in FIG. 1d, and as is conceivable in any of the embodiments in FIGS. 1a-1c, 2a-2d, 3a-3d, 4a-4e, 5a-5f, 6a-6b and 7a-7b, the separate tongue 6 may comprise flexible protrusions 6c that are bendable in a transverse direction TD of the separate tongue. During locking, the separate tongue may be displaced into the insertion groove 5 and outwards therefrom into the recess 7, which for example may include a snap action. The displacement outwards may be caused by virtue of a biasing force of the flexible protrusions 6c. The separate tongue 6 in FIG. 1d may be formed by injection moulding.

The groove 3 may comprise a bottom portion 3a and a pair of opposing, preferably parallel, groove walls 3b, 3c. The insertion groove 5 may be arranged in one of the groove walls 3b. Moreover, the groove 3 may comprise an opening 3d and an inner portion 3e. The opening 3d may be wider than the inner portion 3e along the second direction Y. Preferably, a linear extension LE of an inner wall 5b of the insertion groove and/or a second plane P2 extending along the inner wall 5b is provided at or outside of the first face 1a, preferably along the first direction X. The inner portion 3e may be at least partially disposed inwardly of an opening 5c of the insertion groove 5 along the first direction X. As shown in, e.g., FIGS. 1a-1b, 2a, 2c, 3a-3d, 5a-5e and 6a-6b and 7a-7b, the groove 3 may be asymmetric along a centre line CX of the inner portion 3e extending along the first direction X, preferably as seen in a cross-sectional side view.

The edge section 4 may comprise a first 4a and a second 4b edge portion. The second edge portion 4b, preferably at least a section 4e thereof, may be configured to cooperate with the groove 3, preferably at least a segment 3f of the inner portion 3e, in the locked state, cf. FIGS. 2a-2b and 2d. With respect to the second panel 2, the first edge portion 4a may be arranged outside of the second edge portion 4b along the first direction X. In the locked state, and with respect to the first panel 1, the first 4a, and optionally the second 4b, edge portion may be disposed inwardly of the opening 5c along the first direction X. Moreover, with respect to the second panel 2, the first edge portion 4a preferably tapers outwards along the first direction X. Also, the first edge portion 4a may be asymmetric along the centre line CX in the locked state, e.g., at least by virtue of the recess 7. The edge section 4 may comprise a depression 4d, preferably in the second face 2b and/or in the side edge surface 2c, configured to accommodate a concealment portion 1i of the first panel 1 in the locked state. The concealment portion 1i may be provided outside of the groove 3 along the second direction Y, such as towards the side edge surface 1c.

Preferably, at least a segment 3f of the inner portion 3e has an essentially constant width WG along the second direction Y. Alternatively, or preferably additionally, at least a section 4e of the second edge portion 4b has an essentially constant width WE, preferably along the second direction Y as specified in the locked state. The constant width(s) WG and/or WE of the segment 3f and/or the section 4e may extend along the first direction X, such as corresponding to at least 5% or at least 10% of a depth D of the groove 3, preferably defined as a distance from the first face 1a to the bottom portion 3a of the groove, cf. FIG. 5a. In the locked state, the segment 3f and/or the section 4e may be provided inwardly of the insertion groove 5, such as of the opening 5c, along the first direction X.

The insertion groove 5 may extend along the second direction Y and, preferably, along the first direction X. Indeed, the insertion groove 5 preferably is inclined with respect to the main plane M1. The insertion groove 5 may comprise a pair of oppositely arranged, preferably parallel, inner walls 5a, 5b, see, e.g., FIGS. 1d and 2a. Preferably, the separate tongue 6 is displaceably arranged in the insertion groove 5, such as by being linearly displaceable along a direction L. During locking, the separate tongue 6 may be displaced into the insertion groove 5 and thereafter out of the insertion groove into the recess 7. During locking, the separate tongue 6 may be displaced into the insertion groove by cooperation, such as engagement, between the separate tongue and the edge section 4, such as the first edge portion 4a. The separate tongue may comprise two opposite displacement surfaces 6a, 6b, one or both of which may be displaceable against the inner wall(s) 5a, 5b, preferably during locking.

The recess 7 may be provided in the first face 2a of the second panel 2. With respect to the second panel 2, the recess 7 preferably is provided inwardly of the second edge portion 4b along the first direction X. The locking portion 7a may be provided in a recess wall 7b of the recess. For example, the recess 7 may be substantially triangularly shaped.

The second panel 2 may comprise a fitting groove 13, preferably provided in the edge section 4 and/or in the first face 2a. The fitting groove 13 may be provided inwardly of the recess 7 along the first direction X and with respect to the second panel 2. The fitting groove 13 may be configured to cooperate with a corner portion 14 of the first panel 1, preferably provided in the groove wall 3b and/or the first face 1a, such as forming a joining portion between them.

In the locked state, the first 1 and second 2 panels preferably abut each other such that a face portion 1h, 1h' of the first face 1a provided outside of the groove 3 along the second direction Y may be concealed, cf., FIGS. 2c-2d. For example, an overlapping portion 2h of the depression 4d may cooperate, such as engage, with the face portion 1h. Moreover, section 13a of the fitting groove 13 may cooperate, such as engage, with a section of the corner portion 14, which may form the face portion 1h'.

The cooperation between the separate tongue 6 and the recess 7 and, preferably, between the fitting groove 13 and the corner portion 14 and/or between the overlapping portion 2h and the face portion 1h, may provide locking of the panels 1, 2 in the first direction X. Moreover, the cooperation between the second edge portion 4b and the groove 3, preferably the inner portion 3e, and optionally between the fitting groove 13 and the corner portion 14, may provide locking of the panels 1, 2 in the second direction Y.

The locking portion 7a is disposed at a locking angle $\alpha$ below 45° with respect to the second main plane M2 and/or the first direction X. When the first M1 and second M2 main planes are arranged essentially perpendicularly to each other, the locking angle $\alpha$ may be determined with respect to the second main plane M2 or the first direction X. When the first M1 and second M2 main planes are arranged at an angle $\phi$ between 30° and 150° with respect to each other, the locking angle $\alpha$ may be determined with respect to the rotated second main plane M2' or the first direction X. Likewise, the recess wall 7b may be inclined with respect to the second main plane M2, such as by an angle $\alpha$ below 45°. As shown in, e.g., FIGS. 2b, 2c, 3a, 6a-6b and 7a-7b, a first plane P1 may be arranged along the locking portion 7a and/or the recess wall 7b, any or both of which preferably is/are planar. Thereby, the first plane P1 may be angled with respect to the second main plane M2 (or M2') at the angle $\alpha$. In some embodiments, the locking angle $\alpha$ does not exceed 40°. For example, it may be 20°-40° or 30°-40°, such as 20°-30°.

Thereby, in the locked state, the locking portion 7a, such as the first plane P1, may be disposed at a complementary locking angle $\alpha'$ exceeding 45° with respect to the first main plane M1. Thus, in the locked state, the relation $\alpha+\alpha'=90°$ may hold.

In some embodiments, and as shown in FIGS. 7a-7b, the locking portion 7a and/or the recess wall 7b, may be curved, such as concave (FIG. 7a) or convex (FIG. 7b).

The insertion groove 5 may be provided at an angle β of 18°-45°, with respect to the first main plane M1. In some embodiments, the angle b may be 20°-30°. As shown in, e.g., FIGS. 2c-2d and 3b, a second plane P2 may be arranged along the insertion groove 5, preferably along the inner wall 5b thereof. Thereby, the second plane P2 may be angled with respect to the first main plane M1 at the angle b. The angle β is about 20° in the non-limiting embodiments shown in FIGS. 1a-1b, 2a, 2c-2d, 3a and 3c-3d, and about 27° in the non-limiting embodiment shown in FIG. 3b.

In the locked state, a relative angle g between the locking portion 7a and the insertion groove 5 may be 15°-50°. In some embodiments, the relative angle g is 20°-45° or 20°-30°. Thereby, the first P1 and second P2 planes may be arranged at the angle g in the locked state.

The angles a, b and g may be specified in cross-sectional side views of the panels, such as those shown in, e.g., FIGS. 2a-2d, 3a-3d, 5a-5f and 6a-6b and 7a-7b.

As shown in, e.g., FIGS. 1a, 2c-2d, 3b-3d and 6a-6b and 7a-7b, the edge section 4 may be distanced from the groove 3 in the locked state by a space S. For example, there may be a space S between an outermost portion 4c of the edge section 4 and the bottom portion 3a. The space S may be at least 0.1 mm, such as at least 0.2 mm.

In some embodiments, however, and as shown in, e.g., FIG. 3a, the edge section 4 may cooperate, such as engage, with the groove 3 in the locked state. For example, the outermost portion 4c may cooperate with the bottom portion 3a, preferably along a planar portion.

As illustrated in, for example, FIG. 2d, an outer portion 6d of the separate tongue 6 may be curved or may comprise a bevel. The locking portion 7a may cooperate, such as engage, with the outer portion 6d in the locked state. The outer portion 6d may extend from the insertion groove 5, such as along the second direction Y, when arranged therein in the unlocked state and/or in the locked state, such as by at least 0.1 mm, preferably by at least 1 mm or at least 1.5 mm or at least 2 mm, such as 0.1-10 mm or 0.1-4 mm.

Figure 4C:
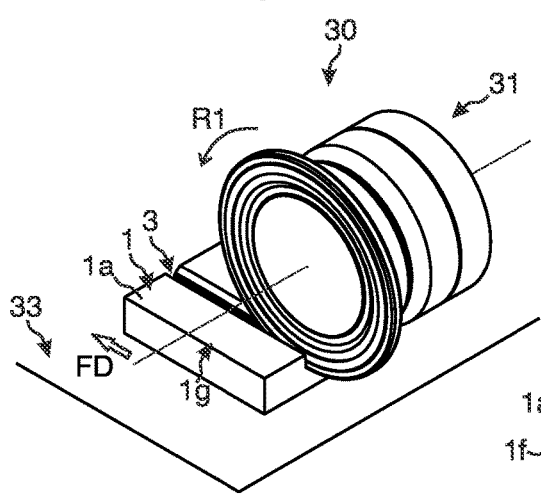
FIGS. 4c-4e illustrate in perspective views (FIGS. 4c-4d) embodiments of an arrangement for forming a mechanical locking device in a panel and a perspective view (FIG. 4e) of an embodiment of a panel.
Figure 4D:
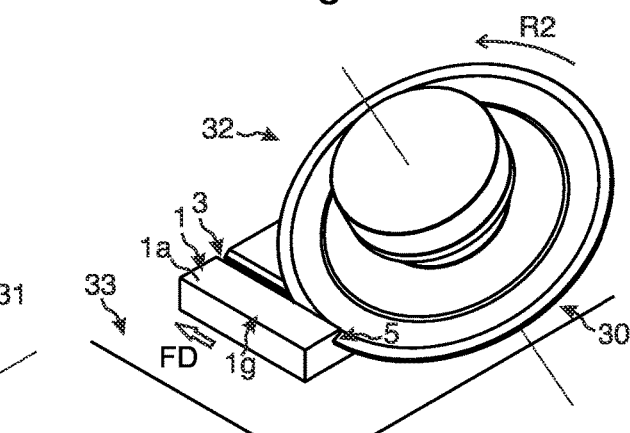

FIGS. 4c-4d and 5a-5e illustrate embodiments of an arrangement 30 for forming a mechanical locking device in a panel 1, preferably the first panel 1. The arrangement 30 may comprise a first 31 and, preferably, a second 32 groove tool and is capable of forming a locking device in accordance with the first aspect of the disclosure in a simple manner. The first groove tool 31 may comprise a cutting tool, preferably comprising cutting teeth, configured to rotate in a first rotational direction R1. Preferably, the first groove tool 31 is provided, and optionally is displaceable, perpendicularly to the first main plane M1, i.e., along the normal N1. The second groove tool 32 may comprise a cutting tool, preferably comprising cutting teeth, configured to rotate in a second rotational direction R2. Preferably, the second groove tool 32 is provided, and optionally is displaceable, at an angle β of 18°-45°, such as 20°-30°, with respect to the first main plane M1. As is appreciated by a skilled artisan, the tools 31, 32 in FIGS. 4c-4d are illustrated in rotational operations, whereby the cutting teeth may not be seen.

The panel 1 may be of any of the types as detailed elsewhere herein. The panel 1 may comprise a core layer 11 or may be layered comprising at least two core layers 11a, 11b, such as three core layers 11a, 11b, 11c. Optionally, the panel may comprise a décor structure 8. Alternatively, or additionally, a thickness T1 of the panel may vary with respect to a nominal thickness value by more than ±0.2 mm, such as at least ±0.3 mm or at least ±0.6 mm or sometimes even at least ±0.8 mm. The nominal thickness value may be determined by the standard described in EN 324-1:1993 or SS-EN 14322:2017. Preferably, the thickness variation is within ±0.1, such as within ±0.08, of the thickness T1. For example, the thickness variation may be in a range of ±0.2 to ±3 mm, such as ±0.3 to ±2 mm.

As shown in FIGS. 4c and 5a, the second face 1b of the panel may be positioned on a support member 33 and thereafter a groove 3 may be formed in an interior portion 1g of the first face 1a of the panel 1 by means of the first groove tool 31. The forming of the groove 3 may comprise a forming of an opening 3d of the groove that is wider than an inner portion 3e of the groove, such that a linear extension LE of an inner wall 5b of the insertion groove 5 and/or a second plane P2 extending along the inner wall 6b is provided at or outside of the first face 1a. Subsequently, and as shown in FIGS. 4d and 5b, an insertion groove 5 may be formed in a groove wall 3b of the groove by means of the second groove tool 32.

FIGS. 4e and 5c-5e illustrate embodiments of a, preferably first, panel 1, comprising a locking device formed by the method above. The panel 1 shown in FIG. 5c corresponds to the panel formed in FIGS. 5a-5b, and the panel in FIG. 5d (or FIG. 5e) is thicker (or thinner) than the panel in FIG. 5c. For example, the first panel 1 (or second panel 2) may be 0.5 to 50 mm thicker, such as 5 to 10 mm thicker, than the second panel 2 (or first panel 1).

The first 31 and/or the second 32 groove tool may be configured to form the groove 3 and/or the insertion groove 5 at a fixed distance L1, L2 from the support member 33, preferably along the normal N1 and/or the first direction X. For example, the tools 31 and/32 may be fixedly arranged, albeit rotating, with respect to the support member during operation. Preferably, the panel 1 and the tools 31 and/or 32 are relatively displaced with respect to each other along a feeding direction FD during operation of the tool(s). Thereby, the groove 3 may extend all the way between the side portions 1e, 1f, cf., FIGS. 1a-1b and 4c-4d. The support member 33 may serve as a reference surface with respect to which the tools 31 and/32 may be calibrated and operated. Thereby, a depth D of the groove 3 and/or a distance V from the first face 1a to the opening 5c, such as to the second plane P2, may vary between panels 1 that vary in thickness T1. For example, and as shown in FIG. 5d (or FIG. 5e), if the thickness T1 is larger (or smaller) with respect to a reference panel, such as the panel 1 in FIG. 5c, the depth D and/or the distance V may become larger (or smaller).

Nevertheless, even if the thickness T1 varies as described above, the groove 3 and the insertion groove 5 formed in accordance with the method described above may be included in a mechanical locking device configured in accordance with the first aspect disclosed herein. Indeed, the inventor has found that by arranging the locking portion 7a at a locking angle α below 45° with respect to the second main plane M2 and/or the first direction X, as detailed elsewhere herein, a sufficiently strong locking strength of the locking device may be provided, even when there is a relatively large variation in thickness of the panels.

Figure 4E:
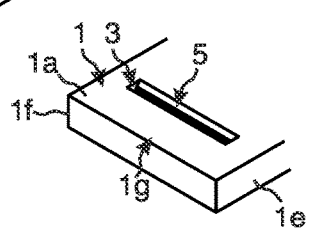

In some embodiments, and as shown in, e.g., FIG. 4e, the groove 3 may be provided within the first face 1a such that it does not extend all the way to the side portions 1e and/or 1f. Such a concealed groove is conceivable in any embodiment herein, such as in FIGS. 1a-1d, 2a-2d, 3a-3d, 4a-4d, 5a-5f, 6a-6b and 7a-7b. Indeed, as indicated above, the tools 31 and/or 32 may be displaceably arranged with respect to the support member 33, and the groove 3 may be formed by displacing the first tool 31 against the interior portion 1g, preferably along the normal N1, and/or the insertion groove 5 may be formed by displacing the second tool 32 against the groove wall 3b, preferably at an angle β of 18°-45°, such as 20°-30°, with respect to the first main plane M1. For example, the tools 31 and/or 32 may be jumping and may be arranged in a CNC machining device.

It is emphasized that the embodiments shown in FIGS. 6a-6b are exemplary and that any of the other elements 1, 2, 3, 4, 5, 6, 7, 8, 9, 10, 11, 12, 13, 14, etc., including their subspecifications 1a, 1b, . . . , 1j, etc., described herein may be utilized therein. For example, the embodiments of the mechanical locking device in any of FIGS. 1a-1d, 2a-2d, 3a-3d, 4c-4e, 5a-5f or 7a-7b are equally conceivable for the panels 1, 2 in FIG. 6a or 6b. In addition, the panels 1, 2 in FIGS. 6a-6b are suitable to adapted to be assembled to an assembled article 20, such as a box or a furniture assembly, in analogy with the embodiments shown in, e.g., FIGS. 4a-4b.

The disclosure has mainly been described above with reference to a few embodiments. However, as is readily appreciated by a person skilled in the art, other embodiments than the ones disclosed above are equally possible within the scope of the disclosure. For example, the set of panels or the assembled article 20 may comprise a plurality of panels similar to the first 1 and second 2 panels, which may be assembled and locked to the panels 1 or 2 and/or to each other in a similar manner as for the first and second panels. Moreover, it is understood that the first panel 1 disclosed herein may be further provided with another similar mechanical locking device arranged at another interior portion 1g of a first face 1a such that a third panel and, optionally, a fourth panel, etc., may assume a locked state with respect thereto, cf., FIGS. 4a-4b. It is understood that the embodiments in, e.g., FIGS. 1a-1c and 2a-2d are schematic and that, for example, a panel length PL may be much larger than shown, for example as illustrated in FIGS. 4a-4b. Finally, it is emphasized, although mostly described with reference to the interior portion 1g, it is equally conceivable that the mechanical locking device described herein, such as in any of FIGS. 1a-1d, 2a-2d, 3a-3d, 4a-4e, 5a-5f, 6a-6b and 7a-7b, may be provided in a corner section 1j of the first face 1a, cf., FIGS. 4a-4b.

The invention claimed is:

1. A set of panels comprising a first panel and a second panel configured to assume a locked state in which a first main plane of the first panel is arranged at an angle (φ) of between 30° and 150°, relative to a second main plane of the second panel, the set comprising:
    a groove provided in the first panel,
    an edge section of the second panel,
    an insertion groove provided in the groove of the first panel, a separate tongue being arranged in the insertion groove, and
    a recess provided in the edge section of the second panel,
    wherein the separate tongue is configured to cooperate with a locking portion of the recess for locking the first and second panels to each other in a first direction perpendicular to the first main plane,
    wherein the edge section of the second panel is configured to cooperate with the groove of the first panel for locking the first and second panels to each other in a second direction parallel to the first main plane and extending towards a side edge surface of the first panel, and
    wherein the locking portion is disposed at a locking angle with respect to the first direction, the locking angle (α) not exceeding 40°.

2. The set according to claim 1, wherein the groove is provided in an interior portion of a first face of the first panel.

3. The set according to claim 1, wherein the insertion groove is provided at an angle (β) of 18°-45°, with respect to the first main plane.

4. The set according to claim 1, wherein the locking portion is planar.

5. The set according to claim 1, wherein the locking angle (α) is 30°-40°.

6. The set according to claim 1, wherein a relative angle (g) between the locking portion and the insertion groove is 15°-50° in the locked state.

7. The set according to claim 1, wherein the edge section is distanced from a bottom portion of the groove in the locked state by a space.

8. The set according to claim 1, wherein an outer portion of the separate tongue is curved or comprises a bevel.

9. The set according to claim 1, wherein the first main plane is arranged essentially perpendicularly to the second main plane.

10. The set according to claim 1, wherein a thickness of the first panel defined by a first and a second face of the first panel varies by more than ±0.2 mm with respect to a nominal thickness value.

11. The set according to claim 1, wherein the first and/or second panel(s) comprises a core layer and a décor structure.

12. The set according to claim 1, wherein the first and/or second panel(s) is/are layered comprising at least two core layers.

13. The set according to claim 1, wherein the first and/or the second panel(s) comprise(s) a sandwich core.

14. An assembled article comprising the set of panels according to claim 1.

* * * * *